T. F. TAYLOR.
AGITATOR.
APPLICATION FILED NOV. 27, 1918.

1,386,809.

Patented Aug. 9, 1921.
2 SHEETS—SHEET 1.

T. F. TAYLOR.
AGITATOR.
APPLICATION FILED NOV. 27, 1918.
1,386,809.
Patented Aug. 9, 1921.
2 SHEETS—SHEET 2.
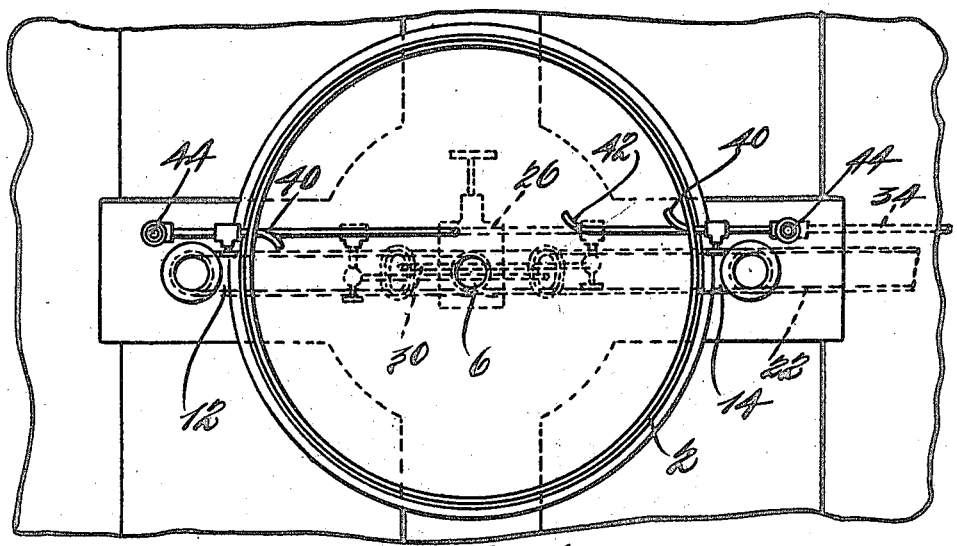
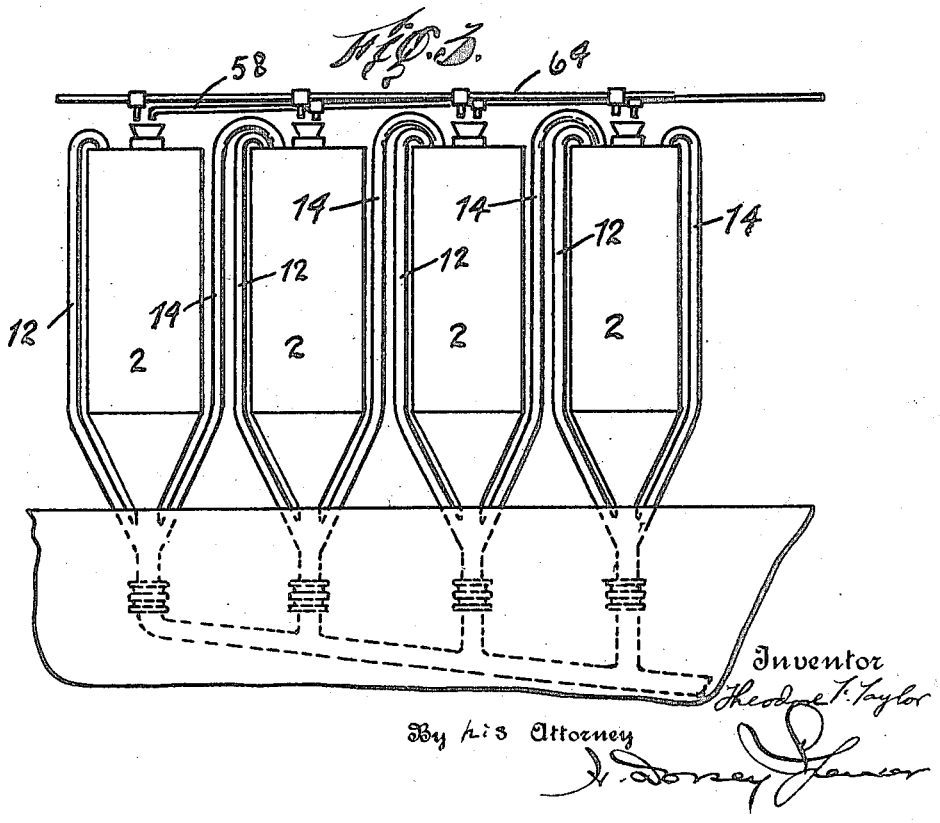
Inventor
Theodore F. Taylor
By his Attorney

UNITED STATES PATENT OFFICE.

THEODORE F. TAYLOR, OF PHILADELPHIA, PENNSYLVANIA.

AGITATOR.

1,386,809.

Specification of Letters Patent.   Patented Aug. 9, 1921.

Application filed November 27, 1918. Serial No. 264,285.

*To all whom it may concern:*

Be it known that I, THEODORE F. TAYLOR, a citizen of the United States, residing at Philadelphia, Pennsylvania, have invented certain new and useful Improvements in Agitators, of which the following is a clear, full, and exact description.

This invention relates to metallurgical apparatus, and particularly to apparatus for use in treating ores by the cyanid process.

A general object of the invention is to provide improved apparatus for use in treating ores by the cyanid process, which will insure the recovery of the maximum amount of gold or silver obtainable by this process, and which at the same time will accelerate the complete treatment of the ore.

More particularly the invention aims to provide apparatus which will both effectively mix the cyanid solution with the milled ore and at the same time will insure the constant renewal of the activity of this solution by continual replacement of the oxygen essential to the reaction.

The invention also aims to provide apparatus for the purposes above set forth, which is simple in construction and which will not easily get out of order, and which requires for its operation only a source of compressed air.

Other objects and important features of the invention will appear from the following description and claims when considered in connection with the accompanying drawings, in which—

Fig. 2 is a section on the line 2—2 of Fig. 1;

Fig. 3 is a somewhat diagrammatic view illustrating a battery of cyanid tanks embodying the present invention arranged in series.

Figure 1:
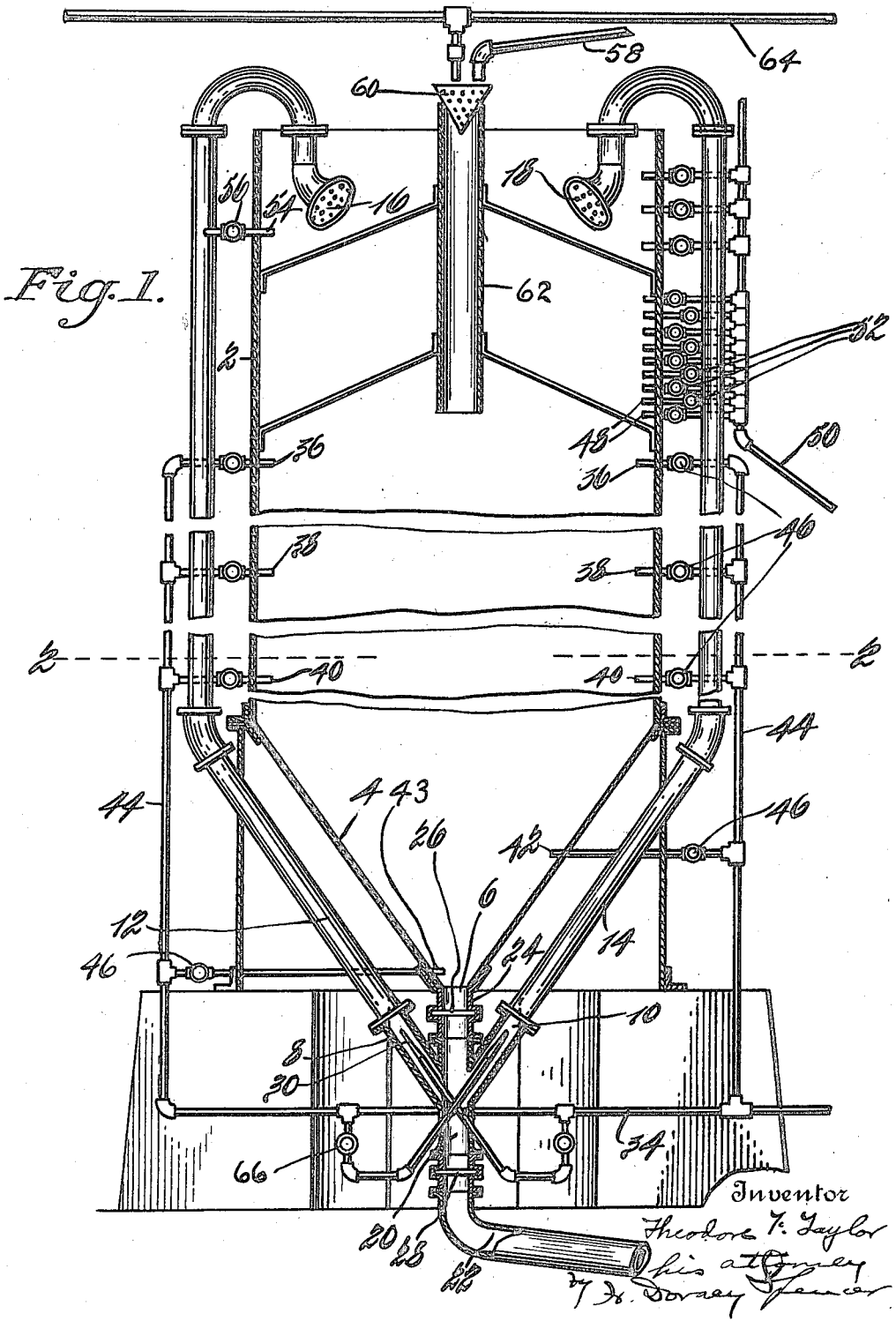
Figure 1 is a vertical section through an apparatus embodying the present invention.

In the treatment of ores by the cyanid process, it is essential, in order to secure the reaction

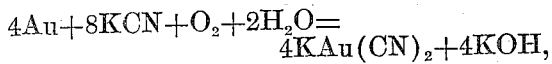
$$4Au + 8KCN + O_2 + 2H_2O = 4KAu(CN)_2 + 4KOH,$$

that oxygen be present either on the ore particles or in the cyanid solution in such form and so distributed that active cyanogen will be freed from the cyanid of the solution to combine with and effect the solution of the gold or of the silver. As hereinabove suggested, therefore, one of the principal objects of the present invention is to insure continuous replacement of the oxygen used up in the reaction represented by the above equation, this replacement being usually obtained by mixing air with the cyanid solution.

It has been attempted heretofore to effect such renewal of the oxygen in the cyanid solution by discharging jets of compressed air into the solution, and it has also been attempted to effect such renewal by simple aeration of the liquid taken from the leaching tank, this liquid being pumped back into the treating tank. Neither method has proved to be effective, since neither insures absorption of the requisite amount of air, nor its uniform distribution throughout the solution.

By the apparatus of the present invention, not only is the solution thoroughly and uniformly aerated, but advantage is taken of the aerating operation to effect a thorough mixing of the ore to be treated with the solution.

Referring now to the drawings, which illustrate a preferred embodiment of the invention, the tank 2, in which the cyanid solution and crushed ore are to be mixed, is shown as provided with a conical bottom 4 having a discharging opening 6 into a Y, which has two arms 8 and 10 connected to conductors or return pipes 12 and 14, discharging at their upper ends through spray heads 16 and 18 above the surface of the liquid in the tank, the leg 20 of the Y being connected to a discharge pipe 22 arranged to carry the slimes to the leaching tanks.

The arm 24 of the Y, into which the tank 2 immediately discharges, is provided with a gate valve 26 by which the contents of the tank may be shut off from the Y, and a similar gate valve 28 is provided between the leg 20 of the Y and the discharge pipe.

Projecting into the arms 8 and 10 of the Y, to such a distance that they constitute inspirator jets, are two air jet pipes 30 and 32 connected outside the Y to a pipe 34 from any suitable source of compressed air. From the foregoing description it will be seen that when there is liquid in the tank 2 and the valve 28 has been closed and the valve 26 opened, the air jets 30 and 32 will serve to cause a flow of liquid up the pipes 12 and 14 and out through the spray heads 16 and 18 upon the surface of the liquid in the tank.

In order to effect an agitation of the solution in the tank to mix the ore thoroughly with the solution, in addition to the agitation and mixing effected by the constant movement of the solution through the pipes 12 and 14, or preferably prior to this movement, means is provided for directing agitating jets of compressed air into the solution in the tank 2. The illustrated means comprises jets 36, 38, 40 and 42 arranged at different levels in the tank and connected outside the tank to vertical branches 44 from the pipe 34, these jets being arranged somewhat tangentially to the cylindrical wall of the tank, as shown in Fig. 2 of drawings, whereby they tend to effect a whirling motion of the solution in the tank. Each of these jets is provided with a suitable valve 46 whereby it may be controlled independently of the others, and thus the agitation of the contents of the tank may be effected either locally or progressively.

In order to test the progress of the cyaniding operation, a series of test nipples 48, connected to a common discharge pipe 50 and controlled by separate valves 52, are projected into the tank and arranged at different levels so that different samples of the solution may be drawn off for test purposes. There is also preferably provided a nipple 54, controlled by a valve 56 and connected to one of the conductors for conducting the solution from the bottom to the top of the tank, the illustrated nipple 54 being connected to the conductor pipe 12. The function of the nipple 54 will appear hereinafter.

The milled ore or tailings are conducted to the tank through the pipe 58 and are preferably strained through a removable conical screen 60 placed in the upper end of the receiving pipe 62 centrally located in the tank.

The present practice is to grind the minerals with cyanid solution in place of pure water, adding at the same time hydraulic lime proportioned to the acidity of the minerals, and thus there is usually provided for the normal operation of this apparatus cyanid solution with the milled ore when it is received in the tank. If it is necessary to increase the strength of the cyanid solution or to repeat the treatment, stock solution may be introduced through the pipe 64.

One mode of operation of the apparatus is as follows: The parts being in the position shown in Fig. 1, the milled ore, together with the cyanid solution in which it has been ground, is conducted through the pipe 58 and into the receiving pipe 62 of the tank being strained through the removable conical screen 60. When a sufficient amount of the slime solution or gangue has accumulated in the bottom of the tank, the upper valve 26 is opened and the air jets are then started in operation by opening the valves 66, thus starting the operation of lifting the solution through the conductor pipes or columns 12 and 14. After the jets have been in operation for a short time, the solution will be lifted to the tops of the columns 12 and 14 and will be discharged through the spray heads 16 and 18 upon the surface of the solution in the tank. The spraying of the solution through the spray-heads 16 and 18 effects an aeration of the solution and at the same time increases the agitation and mixing of the milled ores with the solution.

This operation continues until the tank has been filled to its capacity and the apparatus will then preferably be worked for a further time to effect a thorough action of the cyanid solution upon the minerals without the introduction of further minerals into the tank.

After the apparatus has been operated for the desired length of time, the valve 26 will first be closed and then the air jet operating in the column 12 will preferably be first cut off, thus causing the solution still below the valve 26 to be carried up to the conductor or column 14. In order to carry off any traces of slimes or sands which may remain at the bottom of the columns or conductors, the valve 56 controlling the nipple 54 will preferably be opened for a short time, thus allowing some of the solution from the upper end of the tank to be carried down through the conductor or column 12 and up through the conductor or column 14, thereby effecting a washing out of the conductors. The jet in the column 14 is then closed and the contents of the tank allowed to settle, after which the solutions may be drawn off through the test nipples 48, starting first with the uppermost nipple and carrying the operation down until the solutions drawn off through the nipples show traces of the fine slimes.

If the sands or slimes still in the tank, when assayed, still show minerals of substantial value, the tank is preferably again filled up to the level of the nipple 54 from the stock solution pipe, and these sands or slimes are again treated in the following manner: First the valves 46 controlling the nipples 36 are open, thus effecting a mechanical agitation of the upper part of the charge in the tank by the action of the air jets through these nipples. After a considerable agitation has been set up by the action of the nipples 36, the valves controlling these nipples are closed and the valves controlling the nipples 38 are opened, and then the operation is repeated by closing the valves 38 and opening the valves 40 until eventually the nipples 42 and 43 have been opened, thereby bringing into suspension in the solution all of the mineral which had before been allowed to settle.

After the minerals have thus again been brought into suspension in the solution, the valves controlling the nipples 42 and 43 will be closed, the valve 26 again opened, the air jets 30 started in operation, and the circulation through the conductors or columns 12 and 14 again effected. After again allowing the minerals to settle and again drawing off the solutions through the test nipples and repeating this operation as often as necessary, the valves 26 and 28 may be opened and the slimes and sands drawn off through the bottom of the tank into the discharge pipe 22 to suitable filters.

In Fig. 3 of the drawings is shown a battery of tanks operating on the principle of this invention, in which the right-hand conductor 14 of each tank is arranged to discharge into the succeeding tank. When starting this battery in operation, the first tank will operate only with the left-hand column 12 until the tank is filled, after which the right-hand column 14 will be set in operation to discharge a part of the solution in which the minerals are in suspension into the second tank, this tank being likewise operated with only its left-hand column 12 until it is filled, when its right-hand column 14 will be caused to discharge in the succeeding tank, and so on; thus a substantially continuous operation may be effected.

What I claim as new is—

1. In leaching apparatus, the combination with a liquid holding tank, of a conductor arranged to conduct liquid from the lower part of said tank and to discharge it upon the surface of the liquid in said tank, means for effecting such movement of the liquid, and means for causing said discharged liquid to be sprayed through the air above the surface of the liquid in the tank.

2. In leaching apparatus, the combination with a liquid holding tank, of a plurality of separate conductors communicating with the bottom of said tank for conducting a portion of the liquid from the bottom above the level of the liquid in said tank, inspirator means associated with each conductor for effecting the movement of the liquid therethrough, a common valve controlled means for directing the liquid to said conductors, and means for separately controlling said inspirator means.

3. In leaching apparatus, the combination with a liquid holding tank, of a plurality of separate conductors communicating with the bottom of said tank for conducting a portion of the liquid from the bottom above the level of the liquid in said tank, inspirator means associated with each conductor for effecting the movement of the liquid therethrough, and means whereby liquid in the upper part of said tank may be caused to flow down through one of said conductors and up through another.

4. In leaching apparatus, the combination with a liquid holding tank having a valve-controlled discharge at its bottom, of a conductor associated with said discharge for conducting the discharged liquid above the level of the liquid in said tank, inspirator means for effecting the movement of the liquid through said conductor, means for effecting a preliminary agitation of the liquid in said tank, and means for separately controlling each of the aforesaid means.

5. In leaching apparatus, the combination with a liquid holding tank and a source of compressed air, of means for conducting liquid from the lower part of said tank into position to be discharged upon the surface of the liquid in said tank, means for directing liquid agitating jets of air into said tank in directions to effect a circulation of the liquid transverse to that effected by said conducting means, and an inspirator jet effecting the movement of the liquid through said conductor, said apparatus comprising means tending to direct all of the liquid in said tank into the field of operation of said carrying means.

6. In leaching apparatus, the combination with a liquid holding tank and a source of compressed air, of means for directing liquid agitating jets of air into said tank, means comprising an inspirator jet also operated from said source of compressed air for carrying the liquid from the lower part of said tank into position to be discharged upon the surface of the liquid in said tank, and a valve for interrupting communication with said last mentioned means during the preliminary agitation of a charge.

7. In leaching apparatus, the combination with a liquid holding tank, of means for agitating the contents of said tank comprising separately controlled means for agitating different horizontal strata of the contents of said tank, and independently controlled liquid circulating means, said parts being arranged to permit a depthwise progressive agitation of the liquid before circulation of the liquid is begun.

8. In leaching apparatus, the combination with a liquid holding tank, of means for effecting a horizontal agitation of the contents of said tank arranged at different depths and to be progressively brought into and out of operation to effect a depthwise progressive agitation of the contents of said tank, and independently controllable means for effecting a vertical circulation of the liquid.

9. In leaching apparatus, the combination with a liquid holding tank having a discharge at its bottom and having its bottom shaped to direct the tank contents to said discharge, of a conductor connected to said discharge and arranged to conduct the liquid up outside the tank contents and to discharge it again upon the surface of the liquid in said tank, and inspirator means for effecting such a circulation of the liquid.

10. In leaching apparatus, the combination with a liquid holding tank having a discharge at its bottom and having its bottom shaped to direct the tank contents to said discharge, of a conductor connected to said discharge and arranged to conduct the liquid up outside the tank contents, to discharge it again upon the surface of the liquid in said tank, inspirator means for effecting such a circulation of the liquid, and means for spraying the liquid discharged from said conductor through the air before it strikes the surface of the liquid in the tank.

11. In leaching apparatus, the combination with a liquid holding tank having a discharge at its bottom and having its bottom shaped to direct the tank contents to said discharge, of means for effecting agitation and circulation of the liquid in horizontal directions and a conductor connected to said discharge and arranged to conduct the liquid up outside the tank contents and to discharge it again upon the surface of the liquid in said tank, and inspirator means for effecting such a circulation of the liquid.

Signed at New York city, N. Y., this 4th day of November, 1918.

THEODORE F. TAYLOR.